United States Patent [19]

Yamagata

[11] 4,289,385
[45] Sep. 15, 1981

[54] PHOTOGRAPHIC LENS WITH REAR STOP DIAPHRAGM

[75] Inventor: Masakazu Yamagata, Tsurugashima, Japan

[73] Assignee: Asahi Kogaku Kogyo Kabushiki Kaisha, Tokyo, Japan

[21] Appl. No.: 118,699

[22] Filed: Feb. 5, 1980

[30] Foreign Application Priority Data

Feb. 20, 1979 [JP] Japan ................................. 54-18915

[51] Int. Cl.³ .............................................. G02B 9/60
[52] U.S. Cl. ........................................ 350/468; 350/449
[58] Field of Search ............................... 350/468, 449

[56] References Cited

U.S. PATENT DOCUMENTS 2,664,783   1/1954   Cook ................................. 350/468

Primary Examiner—Conrad J. Clark
Attorney, Agent, or Firm—Sughrue, Mion, Zinn, Macpeak and Seas

[57] ABSTRACT

A lens system including five lenses which are, in order from the object, a first single positive meniscus lens, a second single positive meniscus lens, a third single negative lens, a fourth single meniscus lens and a fifth single positive lens. The overall lens system has an aperture ratio of 1:2.8 and a viewing angle of approximately 24°. A stop diaphragm is disposed at a rear portion of the overall lens system. Operations are well compensated for by providing the various lenses with parameters as specified for the preferred embodiments.

7 Claims, 9 Drawing Figures

PHOTOGRAPHIC LENS WITH REAR STOP DIAPHRAGM

BACKGROUND OF THE INVENTION

The present invention relates to a lens system having five lens components, an aperture ratio of 1:2.8 and a viewing angle of about 24° in which a stop diaphragm is disposed at a rear part of the composite lens system and aberrations are well compensated for.

In general, in many cases, a photographic lens is designed so that a stop diaphragm may be disposed in an air space between selected ones of the lessons. In a specific case, it is also required to provide a stop diaphragm outside of the lens system. In some cameras, it is structurally more convenient to position a shutter and a stop diaphragm behind the lens system. A lens having a rear stop diaphragm may also be a requirement. However, in such a lens, there is an undesirable limitation to the aberration compensation in comparison with other lenses. In addition, it is difficult in such a lens to maintain good optical properties not only in the open state of the stop diaphragm but in each stop-down state. This remains a problem to be solved in a lens having the rear stop diaphragm since there is a requirement that a sufficient amount of peripheral or marginal light be obtained even if the stop value is set to a minimal aperture value. Accordingly, the diameters of the rear lenses must be necessarily broadened although at the same time it becomes difficult to compensate for the aberrations near the outermost portions thereof.

In order to solve the above-noted problems in accordance with one prior art technique, the diameters of the front lenses were reduced. For this, it is necessary to shorten the overall length of the lens system. As a result, the power of each lens must be excessively high so that it is difficult to compensate for various aberrations, particularly, spherical aberration.

SUMMARY OF THE INVENTION

To overcome the above-noted defects, in accordance with the present invention there is provided a lens system having five lens elements, an aperture ratio of 1:2.8 and a viewing angle of about 24°, a ratio K of the addition between the overall length of the lens and the back-focus with respect to the focal length of about 1.06.

Figure 1:
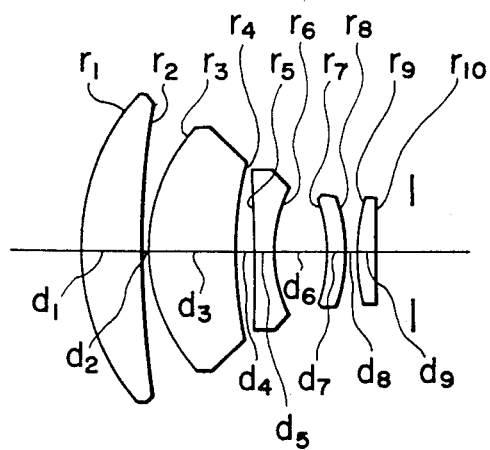
FIG. 1 shows a first example of a lens system of the invention.
Figure 2:
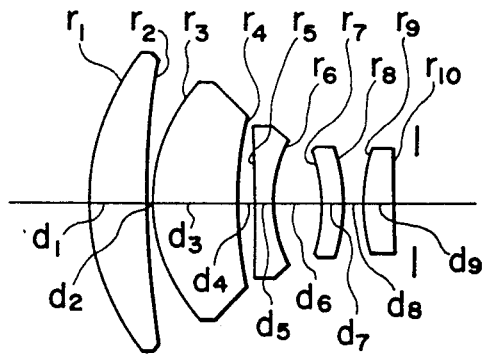
FIG. 2 shows a third example of a lens system of the invention.
Figure 3:
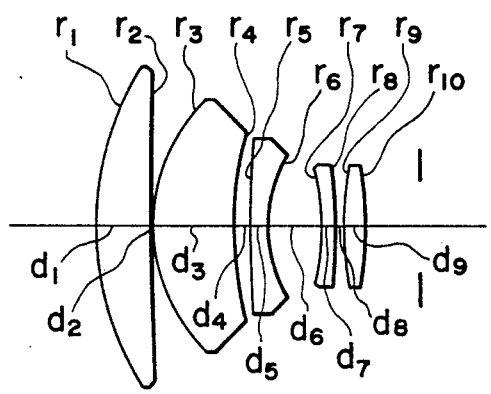
FIG. 3 shows a sixth example of a lens system of the invention.
Figure 4:
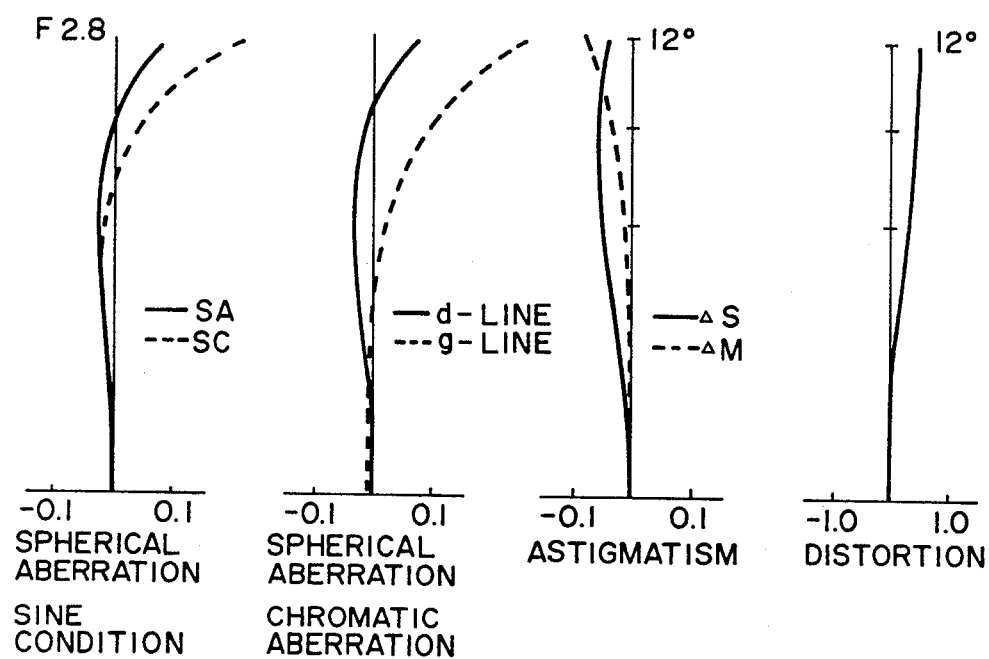
FIGS. 4 to 9 show various aberration curves according to the first through sixth examples.
Figure 5:
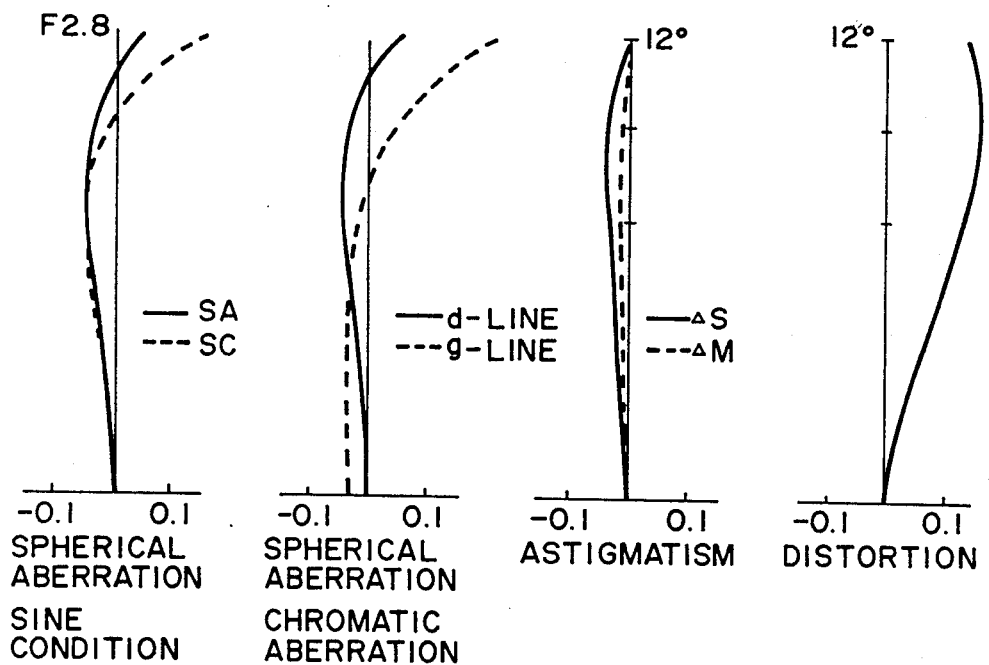
Figure 6:
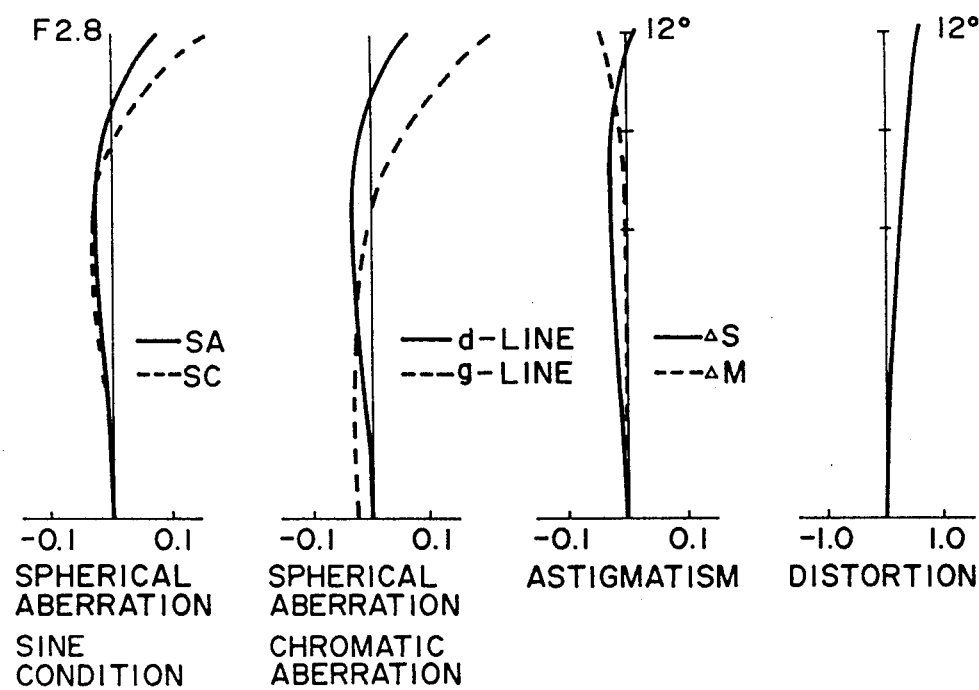
Figure 7:
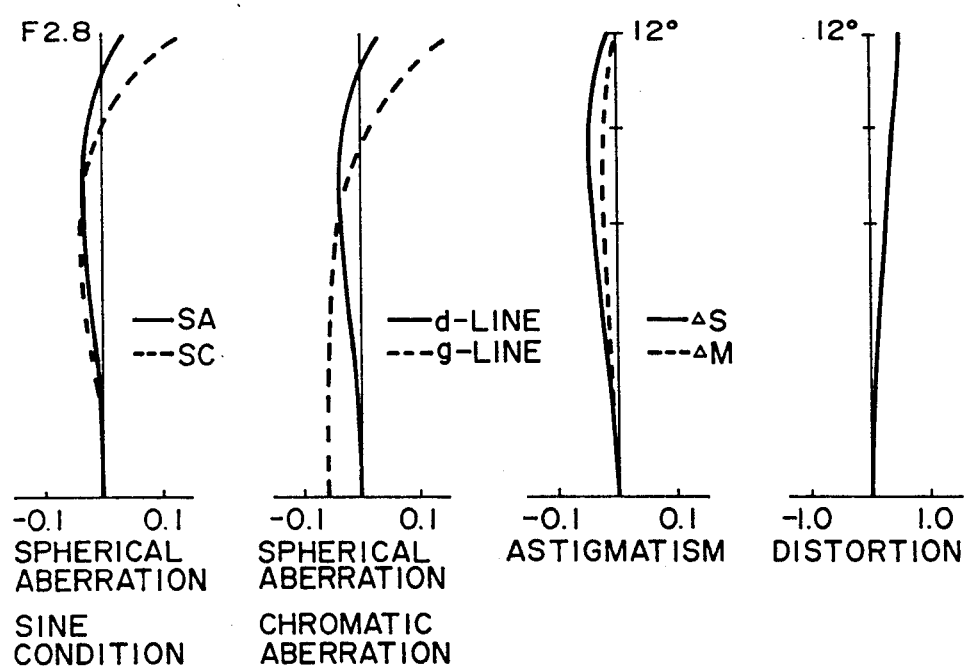
Figure 8:
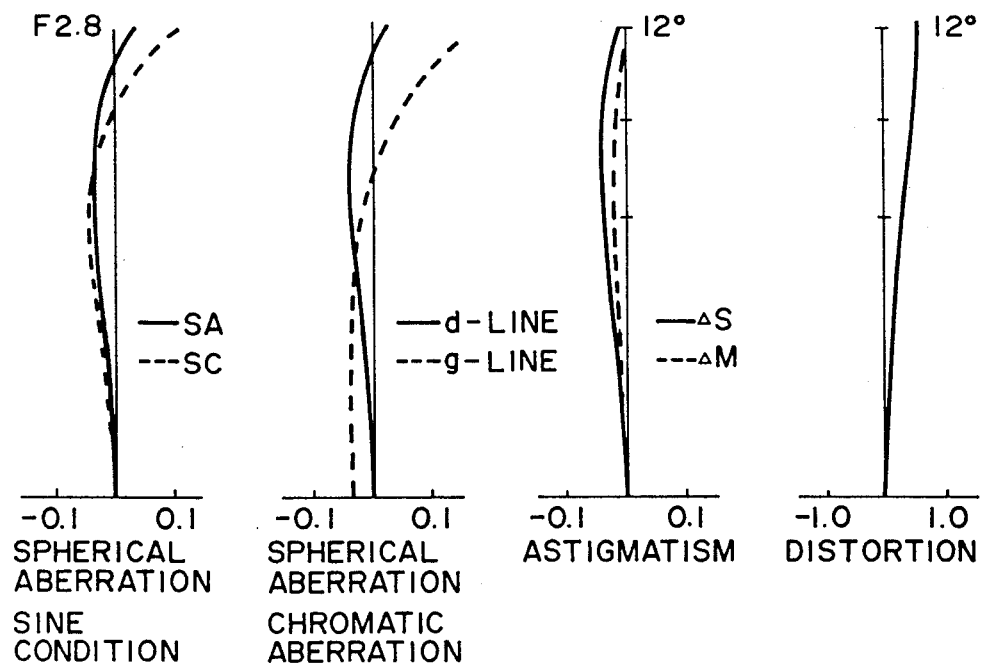
Figure 9:
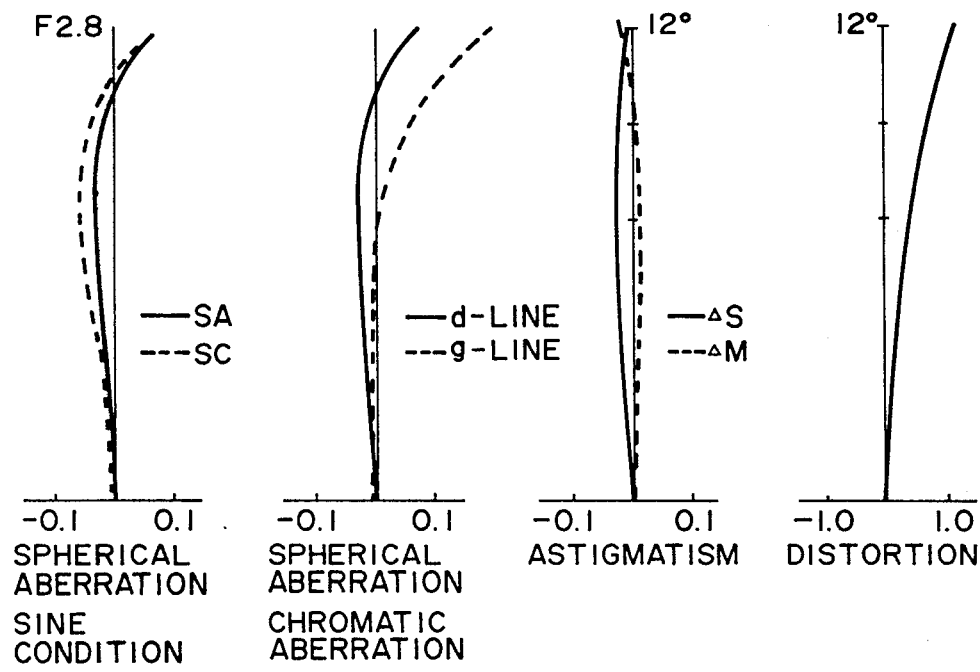

In the drawings: f is the overall focal length, $r_1 \ldots r_{10}$ are the radii of curvature of each lens surface, $d_1 \ldots d_9$ are each lens thickness or each space between the adjacent lenses, nd is the refractive index of each lens, and vd is the Abbe number of each lens.

The parameters for the lenses of each of the examples given in the Figures are shown in the tables of Appendix I.

DESCRIPTION OF THE PREFERRED EMBODIMENTS

The lens system according to the present invention includes in order from the object, a first single meniscus lens, a second single meniscus lens, a third single negative lens, a fourth single meniscus lens and a fifth single positive lens. The composite lens system has thus five lens elements in which the convex surfaces of the first and second lenses are directed to the object, respectivey, the concave surface of the fourth lens is directed to the object, and the stop diaphragm is disposed after the fifth lens. The lens system also satisfies the following conditions:

(1)
$$0.84f < f_1 < 1.04f$$
$$0.43f < f_1 \cdot f_2 < 0.54f$$

(2)
$$0.57f < f_4 \cdot f_5 < 0.78f$$

(3)
$$0.39f < r_1 < 0.64f$$
$$0.25f < r_3 < 0.45f$$
$$0.20f < r_6 < 0.25f$$
$$-0.24f < r_7 < -0.46f$$

(4)
$$0.48f < \Sigma d < 0.58f$$
$$0.12f < d_3 < 0.18f$$
$$0.07f < d_6 < 0.13f$$

where:
f is the overall focal length;
$f_1$ is the focal length of the first lens;
$f_1 \cdot f_2$ is the resultant focal length of the first and second lenses;
$f_4 \cdot f_5$ is the resultant focal length of the fourth and fifth lenses;
$r_1$ is the radius of curvature of the object side surface of the first lens;
$r_3$ is the radius of curvature of the object side surface of the second lens;
$r_6$ is the radius of curvature of the image side surface of the third lens;
$r_7$ is the radius of curvature of the object side surface of the fourth lens;
$d_3$ is the thickness of the second lens; and
$d_6$ is the air space length between the third and fourth lenses.

The reasons for the above-described conditions will be explained.

Condition (1)

Condition (1) represents the range in which the overall lens length is maintained short and the diameter of the first lens is maintained as small as possible within the limitation that no problem be caused, even in case of deficient marginal light amount, with a minimum stop-down setting. Condition (1) specified such a range with respect to the focal length of the first lens and the resultant focal length of the first and second lenses.

If the upper limits were to be exceeded, it would be difficult to shorten the overall lens length resulting in a reduction of the amount of light at the marginal portion. In order to avoid this, it is necessary to increase the diameter of the first lens resulting in an increase of the overall length of the lens. On the other hand, if the lower limits were to be exceeded, the lens power of each lens element would have to be increased leading to extreme difficulties in compensating for spherical aberration and for rays of lights deviating from the optical axis. The lens in that case would have a high incident height so that it would be impossible to maintain the brightness such as at an aperture ratio of 1:2.8.

Condition (2)

This condition represents the range in which, under the limitation of Condition (1), while the overall lens length is held as short as possible, the stop diaphragm can be disposed at a position where a sufficient amount of outermost marginal light can be obtained even for minimum stop-down of the rear stop diaphragm. In addition, while the backfocus is maintained at a sufficient length to meet structural requirements, the ratio K can be maintained less than 1.06. Condition (2) specifies the range with respect to the resultant focal length of the fourth and fifth lenses.

Therefore, if the upper limit were to be exceeded, that is, if the resultant power of the fourth and fifth lenses were to be weakened, it would be necessary to increase the resultant power of the first, second and third lenses so that the backfocus of the overall lens system is shortened. Accordingly, the space available for provision of the shutter and the rear stop diaphragm is limited. This is disadvantageous in view of the structural requirements of the lens.

If the lower limit were to be exceeded, since the backfocus of the overall lens system would then be lengthened, it would be very difficult to decrease the ratio K below about 1.06.

Condition (3)

This condition represents the ranges of the radii of curvature of the first, second, third and fourth lenses. $r_1$ is the surface, directed to the object, of the first lens. If its radius of curvature were to exceed the lower limit of the relationship of $0.39f < r_1 < 0.64f$, compensation for the spherical aberration would become insufficient and also compensation for the comatic aberration would be very difficult. Moreover, if the upper limit were to be exceeded, the radius of curvature of the second lens surface would need to be greater than that defined in Condition (1) or would have to be negative so that it would be difficult to compensate for aberrations of marginal portions with respect to incident light, particularly comatic aberrations.

$r_3$ represents a surface of the third lens on the object side which surface mainly serves to make the Petzval's sum appropriate so that curvature of field and astigmatism may be well corrected. Therefore, if the lower limit of the inequality of $0.25f < r_3 < 0.45f$ were to be violated, the Petzval's sum would increase resulting in worsened astigmatism and difficulties in compensating for comatic aberrations. On the other hand, if the upper limit were to be exceeded, the Petzval's sum would be excessively decreased resulting in poor balance in astigmatism or in the necessity that the radius of curvature of surface $r_4$ be greater than that defined in Condition (1) of $0.43f < f_1 \cdot f_2 < 0.54f$ or that the lens power of the first lens be increased. In either case, it is difficult to compensate for aberrations of marginal portions with respect to the incident light, particularly comatic aberrations and astigmatism, and in addition distortion would increase disadvantageously.

$r_6$ designates the surface of the third lens on the image side which is concave and which is effective in the compensation for spherical aberration and the Petzval's sum. If the lower limit of $0.20f < r_6 < 0.25f$ were exceeded, compensation for spherical aberration would be excessive thereby worsening comatic variations and the Petzval's sum would excessively decrease so that maintenance of the balance of the astigmatism would be impossible. On the other hand, if the upper limit were to be exceeded, compensation for the spherical aberration would be insufficient and, particularly, comatic flare due to the light flux having a high incident height which deviates from the optical axis would be generated. Also, in this case, the Petzval's sum would excessively increase so that the astigmatism would deteriorate.

$r_7$ designates the concave surface of the fourth lens on the object side which is effective in the compensation for the comatic aberration and astigmatism. Therefore, if the lower limit of $-0.24f < r_7 < -0.46f$ were to be exceeded, an inward comatic flare would be generated in the form of stripes due to light flux having a high incident height and deviating from the optical axis. Compensation for the astigmatism would also be excessive. As a result, it would be very difficult to compensate for these aberrations. Should the upper limit be exceeded, an outward comatic flare would be generated due to the light flux having a high incident height, which deviates from the optical axis. Thus, astigmatism compensation would be insufficient and comatic and astigmatism compensation would be difficult.

Condition (4)

This condition is related to the lens thickness or the air space length between adjacent lenses. Respective inequalities represent the appropriate range with respect to the overall length of the lens, the thickness of the second lens and the space between the third and fourth lenses. If the lower limit of $0.48 < \Sigma d < 0.58f$ were to be exceeded, the thickness of the lens or the thickness of the lens edge would be too small for the lens system to meet the requirements of the present invention wherein the aperture ratio is 1:2.8 and the system is composed of just five lenses. As a result, it would be extremely difficult to manufacture such lenses. Inversely, if the upper limit were to be exceeded, the overall lens length would become too long resulting in an increase of the diameters of the front lenses. It is very difficult to compensate for aberration of image field in the outermost portions of the image under the limitation of Conditions (1) to (3) and, in addition, the overall length of the lens system would be increased disadvantageously. If the lower limit of the inequality of $0.12f < d_3 < 0.18f$ were to be exceeded, the spherical aberration would become excessive so that compensation therefor would be difficult. Also, since the height incident to the third lens of the light would deviate from the optical axis, compensation for various aberrations, particularly the comatic aberrations, would be difficult. Above the upper limit, spherical aberration compensation would be deficient and the overall length of the lens system would be elongated disadvantageously. If the lower limit of $0.07f < d_6 < 0.13f$ were to be exceeded, comatic flare of light rays deviating from the optical axis and having a high incident height and being incident to the fourth lens would be significantly generated and distortion would also increase so that compensation for the aberrations due to light deviating from the optical axis would be difficult. Should the upper limit be exceeded, the overall length of the lens system would be elongated so that the backfocus is shortened. As a result, the rear stop diaphragm could not then be positioned at a desirable position. The desired position of the rear stop diaphragm could not achieved as well. Six examples of lenses which meet these conditions are specified below in Appendix I.

APPENDIX I

EXAMPLE 1 (FIG. 1)

| $f = 100$ | $F_{NO.}$ 1:2.8 | | $2\omega = 24°$ | $K = 1.049$ |
|---|---|---|---|---|
| $r_1$ | 45.735 | | $n_d$ | $\nu_d$ |
| | | $d_1$ 10.853 | 1.60311 | 60.7 |
| $r_2$ | 210.900 | | | |
| | | $d_2$ 1.290 | | |
| $r_3$ | 33.385 | | | |
| | | $d_3$ 15.872 | 1.51633 | 64.1 |
| $r_4$ | 77.025 | | | |
| | | $d_4$ 3.155 | | |
| $r_5$ | 3392.655 | | | |
| | | $d_5$ 3.591 | 1.80518 | 25.4 |
| $r_6$ | 22.917 | | | |
| | | $d_6$ 9.900 | | |
| $r_7$ | −33.391 | | | |
| | | $d_7$ 3.353 | 1.74077 | 27.8 |
| $r_8$ | −29.895 | | | |
| | | $d_8$ 2.321 | | |
| $r_9$ | 43.549 | | | |
| | | $d_9$ 3.234 | 1.66446 | 35.8 |
| $r_{10}$ | 238.081 | | | |
| $\Sigma d = 53.569$ | | | | |

EXAMPLE 2

| $f = 100$ | $F_{NO.}$ 1:2.8 | | $2\omega = 24°$ | $K = 1.050$ |
|---|---|---|---|---|
| $r_1$ | 45.779 | | $n_d$ | $\nu_d$ |
| | | $d_1$ 10.912 | 1.62299 | 58.1 |
| $r_2$ | 185.699 | | | |
| | | $d_2$ 1.210 | | |
| $r_3$ | 33.431 | | | |
| | | $d_3$ 15.832 | 1.51633 | 64.1 |
| $r_4$ | 78.549 | | | |
| | | $d_4$ 3.075 | | |
| $r_5$ | 2285.548 | | | |
| | | $d_5$ 3.591 | 1.80518 | 25.4 |
| $r_6$ | 22.818 | | | |
| | | $d_6$ 10.218 | | |
| $r_7$ | −33.669 | | | |
| | | $d_7$ 3.353 | 1.71736 | 29.5 |
| $r_8$ | −29.566 | | | |
| | | $d_8$ 2.301 | | |
| $r_9$ | 41.904 | | | |
| | | $d_9$ 3.254 | 1.66446 | 35.8 |
| $r_{10}$ | 179.908 | | | |
| $\Sigma d = 53.746$ | | | | |

EXAMPLE 3 (FIG. 2)

| $f = 100$ | $F_{NO.}$ 1:2.8 | | $2\omega = 24°$ | $K = 1.049$ |
|---|---|---|---|---|
| $r_1$ | 46.146 | | $n_d$ | $\nu_d$ |
| | | $d_1$ 10.654 | 1.64000 | 60.1 |
| $r_2$ | 205.061 | | | |
| | | $d_2$ 0.972 | | |
| $r_3$ | 33.520 | | | |
| | | $d_3$ 15.674 | 1.51633 | 64.1 |
| $r_4$ | 82.197 | | | |
| | | $d_4$ 2.976 | | |
| $r_5$ | 1307.390 | | | |
| | | $d_5$ 3.472 | 1.80518 | 25.4 |
| $r_6$ | 22.806 | | | |
| | | $d_6$ 8.888 | | |
| $r_7$ | −33.292 | | | |
| | | $d_7$ 4.028 | 1.72825 | 28.5 |
| $r_8$ | −30.512 | | | |
| | | $d_8$ 3.710 | | |
| $r_9$ | 45.535 | | | |
| | | $d_9$ 5.714 | 1.67270 | 32.1 |
| $r_{10}$ | 217.551 | | | |
| $\Sigma d = 56.088$ | | | | |

EXAMPLE 4

| $f = 100$ | $F_{NO.}$ 1:2.8 | | $2\omega = 24°$ | $K = 1.039$ |
|---|---|---|---|---|
| $r_1$ | 46.843 | | $n_d$ | $\nu_d$ |
| | | $d_1$ 9.778 | 1.67000 | 57.3 |
| $r_2$ | 179.773 | | | |
| | | $d_2$ 0.198 | | |
| $r_3$ | 33.945 | | | |
| | | $d_3$ 15.233 | 1.55963 | 61.1 |
| $r_4$ | 82.026 | | | |
| | | $d_4$ 2.340 | | |
| $r_5$ | 333.433 | | | |
| | | $d_5$ 3.412 | 1.76182 | 26.6 |
| $r_6$ | 22.060 | | | |
| | | $d_6$ 10.790 | | |
| $r_7$ | −33.407 | | | |
| | | $d_7$ 3.769 | 1.54072 | 47.2 |
| $r_8$ | −30.184 | | | |
| | | $d_8$ 3.848 | | |
| $r_9$ | 50.320 | | | |
| | | $d_9$ 6.149 | 1.68893 | 31.1 |
| $r_{10}$ | 201.892 | | | |
| $\Sigma d = 55.517$ | | | | |

EXAMPLE 5

| $f = 100$ | $F_{NO.}$ 1:2.8 | | $2\omega = 24°$ | $K = 1.038$ |
|---|---|---|---|---|
| $r_1$ | 46.861 | | $n_d$ | $\nu_d$ |
| | | $d_1$ 9.801 | 1.67000 | 57.3 |
| $r_2$ | 180.474 | | | |
| | | $d_2$ 0.198 | | |
| $r_3$ | 33.960 | | | |
| | | $d_3$ 15.237 | 1.55963 | 61.1 |
| $r_4$ | 81.416 | | | |
| | | $d_4$ 2.361 | | |
| $r_5$ | 330.254 | | | |
| | | $d_5$ 3.412 | 1.76182 | 26.6 |
| $r_6$ | 22.078 | | | |
| | | $d_6$ 10.674 | | |
| $r_7$ | −33.305 | | | |
| | | $d_7$ 3.809 | 1.51633 | 64.1 |
| $r_8$ | −30.017 | | | |
| | | $d_8$ 3.809 | | |
| $r_9$ | 50.675 | | | |
| | | $d_9$ 6.150 | 1.68893 | 31.1 |
| $r_{10}$ | 212.271 | | | |
| $\Sigma d = 55.451$ | | | | |

EXAMPLE 6 (FIG. 3)

| $f = 100$ | $F_{NO.}$ 1:2.8 | | $2\omega = 24°$ | $K = 1.058$ |
|---|---|---|---|---|
| $r_1$ | 57.928 | | $n_d$ | $\nu_d$ |
| | | $d_1$ 9.700 | 1.62280 | 57.1 |
| $r_2$ | 781.092 | | | |
| | | $d_2$ 0.200 | | |
| $r_3$ | 31.276 | | | |
| | | $d_3$ 15.680 | 1.51633 | 64.1 |
| $r_4$ | 66.664 | | | |
| | | $d_4$ 2.980 | | |
| $r_5$ | 311.160 | | | |
| | | $d_5$ 3.340 | 1.78472 | 25.7 |
| $r_6$ | 22.864 | | | |
| | | $d_6$ 10.580 | | |
| $r_7$ | −42.118 | | | |
| | | $d_7$ 2.780 | 1.56965 | 49.3 |
| $r_8$ | −82.936 | | | |
| | | $d_8$ 1.420 | | |
| $r_9$ | 103.924 | | | |
| | | $d_9$ 3.900 | 1.72342 | 37.9 |
| $r_{10}$ | −53.328 | | | |
| $\Sigma d = 50.580$ | | | | |

What is claimed is:

1. A lens system comprising, in order from the object, a first single meniscus lens, a second single meniscus lens, a third single negative lens, a fourth single meniscus lens and a fifth single positive lens wherein:

| f = 100 | | F$_{NO.}$ 1:2.8 | 2ω = 24° | K = 1.049 |
|---|---|---|---|---|
| r$_1$ | 45.735 | | n$_d$ | ν$_d$ |
| | | d$_1$ 10.853 | 1.60311 | 60.7 |
| r$_2$ | 210.900 | | | |
| | | d$_2$ 1.290 | | |
| r$_3$ | 33.385 | | | |
| | | d$_3$ 15.872 | 1.51633 | 64.1 |
| r$_4$ | 77.025 | | | |
| | | d$_4$ 3.155 | | |
| r$_5$ | 3392.655 | | | |
| | | d$_5$ 3.591 | 1.80518 | 25.4 |
| r$_6$ | 22.917 | | | |
| | | d$_6$ 9.900 | | |
| r$_7$ | −33.391 | | | |
| | | d$_7$ 3.353 | 1.74077 | 27.8 |
| r$_8$ | −29.895 | | | |
| | | d$_8$ 2.321 | | |
| r$_9$ | 43.549 | | | |
| | | d$_9$ 3.234 | 1.66446 | 35.8 |
| r$_{10}$ | 238.081 | | | |
| Σd = 53.569 | | | | |

2. A lens system comprising, in order from the object, a first single meniscus lens, a second single meniscus lens, a third single negative lens, a fourth single meniscus lens and a fifth single positive lens wherein:

| f = 100 | | F$_{NO.}$ 1:2.8 | 2ω = 24° | K = 1.050 |
|---|---|---|---|---|
| r$_1$ | 45.779 | | n$_d$ | ν$_d$ |
| | | d$_1$ 10.912 | 1.62299 | 58.1 |
| r$_2$ | 185.699 | | | |
| | | d$_2$ 1.210 | | |
| r$_3$ | 33.431 | | | |
| | | d$_3$ 15.832 | 1.51633 | 64.1 |
| r$_4$ | 78.549 | | | |
| | | d$_4$ 3.075 | | |
| r$_5$ | 2285.548 | | | |
| | | d$_5$ 3.591 | 1.80518 | 25.4 |
| r$_6$ | 22.818 | | | |
| | | d$_6$ 10.218 | | |
| r$_7$ | −33.669 | | | |
| | | d$_7$ 3.353 | 1.71736 | 29.5 |
| r$_8$ | −29.566 | | | |
| | | d$_8$ 2.301 | | |
| r$_9$ | 41.904 | | | |
| | | d$_9$ 3.254 | 1.66446 | 35.8 |
| r$_{10}$ | 179.908 | | | |
| Σd = 53.746 | | | | |

3. A lens system comprising, in order from the object, a first single meniscus lens, a second single meniscus lens, a third single negative lens, a fourth single meniscus lens and a fifth single positive lens wherein:

| f = 100 | | F$_{NO.}$ 1:2.8 | 2ω = 24° | K = 1.049 |
|---|---|---|---|---|
| r$_1$ | 46.146 | | n$_d$ | ν$_d$ |
| | | d$_1$ 10.654 | 1.64000 | 60.1 |
| r$_2$ | 205.061 | | | |
| | | d$_2$ 0.972 | | |
| r$_3$ | 33.520 | | | |
| | | d$_3$ 15.674 | 1.51633 | 64.1 |
| r$_4$ | 82.197 | | | |
| | | d$_4$ 2.976 | | |
| r$_5$ | 1307.390 | | | |
| | | d$_5$ 3.472 | 1.80518 | 25.4 |
| r$_6$ | 22.806 | | | |
| | | d$_6$ 8.888 | | |
| r$_7$ | −33.292 | | | |
| | | d$_7$ 4.028 | 1.72825 | 28.5 |
| r$_8$ | −30.512 | | | |
| | | d$_8$ 3.710 | | |
| r$_9$ | 45.535 | | | |

-continued

| f = 100 | | F$_{NO.}$ 1:2.8 | 2ω = 24° | K = 1.049 |
|---|---|---|---|---|
| | | d$_9$ 5.714 | 1.67270 | 32.1 |
| r$_{10}$ | 217.551 | | | |
| Σd = 56.088 | | | | |

4. A lens system comprising, in order from the object, a first single meniscus lens, a second single meniscus lens, a third single negative lens, a fourth single meniscus lens and a fifth single positive lens wherein:

| f = 100 | | F$_{NO.}$ 1:2.8 | 2ω = 24° | K = 1.039 |
|---|---|---|---|---|
| r$_1$ | 46.843 | | n$_d$ | ν$_d$ |
| | | d$_1$ 9.778 | 1.67000 | 57.3 |
| r$_2$ | 179.773 | | | |
| | | d$_2$ 0.198 | | |
| r$_3$ | 33.945 | | | |
| | | d$_3$ 15.233 | 1.55963 | 61.1 |
| r$_4$ | 82.026 | | | |
| | | d$_4$ 2.340 | | |
| r$_5$ | 333.433 | | | |
| | | d$_5$ 3.412 | 1.76182 | 26.6 |
| r$_6$ | 22.060 | | | |
| | | d$_6$ 10.790 | | |
| r$_7$ | −33.407 | | | |
| | | d$_7$ 3.769 | 1.54072 | 47.2 |
| r$_8$ | −30.184 | | | |
| | | d$_8$ 3.848 | | |
| r$_9$ | 50.320 | | | |
| | | d$_9$ 6.149 | 1.68893 | 31.1 |
| r$_{10}$ | 201.892 | | | |
| Σd = 55.517 | | | | |

5. A lens system comprising, in order from the object, a first single meniscus lens, a second single meniscus lens, a third single negative lens, a fourth single meniscus lens and a fifth single positive lens wherein:

| f = 100 | | F$_{NO.}$ 1:2.8 | 2ω = 24° | K = 1.038 |
|---|---|---|---|---|
| r$_1$ | 46.861 | | n$_d$ | ν$_d$ |
| | | d$_1$ 9.801 | 1.67000 | 57.3 |
| r$_2$ | 180.474 | | | |
| | | d$_2$ 0.198 | | |
| r$_3$ | 33.960 | | | |
| | | d$_3$ 15.237 | 1.55963 | 61.1 |
| r$_4$ | 81.416 | | | |
| | | d$_4$ 2.361 | | |
| r$_5$ | 330.254 | | | |
| | | d$_5$ 3.412 | 1.76182 | 26.6 |
| r$_6$ | 22.078 | | | |
| | | d$_6$ 10.674 | | |
| r$_7$ | −33.305 | | | |
| | | d$_7$ 3.809 | 1.51633 | 64.1 |
| r$_8$ | −30.017 | | | |
| | | d$_8$ 3.809 | | |
| r$_9$ | 50.675 | | | |
| | | d$_9$ 6.150 | 1.68893 | 31.1 |
| r$_{10}$ | 212.271 | | | |
| Σd = 55.451 | | | | |

6. A lens system comprising, in order from the object, a first single meniscus lens, a second single meniscus lens, a third single negative lens, a fourth single meniscus lens and a fifth single positive lens wherein:

| f = 100 | | F$_{NO.}$ 1:2.8 | 2ω = 24° | K = 1.058 |
|---|---|---|---|---|
| r$_1$ | 57.928 | | n$_d$ | ν$_d$ |
| | | d$_1$ 9.700 | 1.62280 | 57.1 |
| r$_2$ | 781.092 | | | |
| | | d$_2$ 0.200 | | |
| r$_3$ | 31.276 | | | |
| | | d$_3$ 15.680 | 1.51633 | 64.1 |

-continued

| f = 100 | | F$_{NO.}$ 1:2.8 | | 2ω = 24° | K = 1.058 |
|---|---|---|---|---|---|
| r$_4$ | 66.664 | | | | |
| | | d$_4$ | 2.980 | | |
| r$_5$ | 311.160 | | | | |
| | | d$_5$ | 3.340 | 1.78472 | 25.7 |
| r$_6$ | 22.864 | | | | |
| | | d$_6$ | 10.580 | | |
| r$_7$ | −42.118 | | | | |
| | | d$_7$ | 2.780 | 1.56965 | 49.3 |
| r$_8$ | −82.936 | | | | |
| | | d$_8$ | 1.420 | | |
| r$_9$ | 103.924 | | | | |
| | | d$_9$ | 3.900 | 1.72342 | 37.9 |
| r$_{10}$ | −53.328 | | | | |
| | Σd = 50.580 | | | | |

7. The lens system of any of claims 1 to 6 comprising a stop diaphragm positioned at the rear of said lens system.

* * * * *